United States Patent [19]

Stephens

[11] Patent Number: 5,203,856
[45] Date of Patent: Apr. 20, 1993

[54] TOOL FOR FINISHING AND CHAMFERING A HOLE

[75] Inventor: Raymond Stephens, Sterling Heights, Mich.

[73] Assignee: GTE Valenite Corporation, Troy, Mich.

[21] Appl. No.: 855,964

[22] Filed: Mar. 23, 1992

[51] Int. Cl.5 ............................................. B23B 51/00
[52] U.S. Cl. ..................................... 408/159; 82/1.2; 408/180
[58] Field of Search ............... 408/153, 158, 159, 160, 408/180; 82/1.2, 1.3

[56] References Cited

U.S. PATENT DOCUMENTS

| | | | |
|---|---|---|---|
| 2,295,135 | 9/1942 | Smith | 408/180 |
| 2,369,875 | 2/1945 | Wanelik | 408/159 |
| 2,540,520 | 2/1951 | Hoern | 408/180 |
| 4,573,824 | 3/1986 | Ehle | 279/67 |

FOREIGN PATENT DOCUMENTS

| | | | |
|---|---|---|---|
| 511147 | 8/1976 | U.S.S.R. | 82/1.2 |
| 908540 | 2/1982 | U.S.S.R. | 82/1.2 |
| 1342608 | 10/1987 | U.S.S.R. | 82/1.2 |

Primary Examiner—Daniel W. Howell
Attorney, Agent, or Firm—Bill C. Panagos

[57] ABSTRACT

A tool mechanism for machining a hole side surface, and for chamfering the ends of the hole, includes a boring cutter and two chamfer cutters oriented so that during an axial infeed of the cutter assembly the hole side surface is machined and a chamfer is formed at one end of the hole. The cutter assembly can be shifted transversely to position a chamfer cutter for machining a second chamfer on the other end of the hole. The cutter assembly is carried on a cutter support member that is swingably mounted on a tool body secured to the spindle of the cutting machine. An actuator device is movable along the tool body axis to adjust the position of the cutter support member.

17 Claims, 1 Drawing Sheet

TOOL FOR FINISHING AND CHAMFERING A HOLE

BACKGROUND

1. Field of the Invention

This invention relates to a tool for finishing and chamfering a hole in a workpiece. The tool is designed for repetitive production usage on similar multiple work pieces.

2. Prior Art Developments

Equipments that involve pivotable connections between two components often employ a bushing press fit in one component and a shaft carried by the other component for extension through the bushing. In order to press fit the bushing into the mounting hole in the associated component it is often necessary or desirable to chamfer the ends of the hole. There are other situations where a hole is required to be finished and chamfered at its opposite ends.

Commonly the hole is finished and chamfered in separate operations or steps. The present invention is concerned with a tool that forms a finished surface on a circular hole, and also forms chamfers on opposite ends of the finished hole.

SUMMARY OF THE INVENTION

The present invention relates to a tool that can be mounted for operation by supporting a boring cutter and two chamfer cutters. The three cutters are preferably incorporated into a single cartridge that is inserted on the leading end of a transversely-shiftable cutter support member.

The machine cycle may be such that the tool can be rotated and simultaneously fed into the workpiece, whereby the boring cutter forms a finished surface on a through hole in the workpiece. One of the chamfer cutters is spaced axially from the boring cutter so that when the tool nears the end of the infeed stroke, that chamfer cutter automatically comes into engagement with a mouth surface at one end of the hole; the chamfer cutter thereby forms a chamfer at one end of the hole.

The cutter support member is transversely shiftable so that when the tool reaches the end of its axial infeed stroke the support member can be shifted to bring the other chamfer cutter against a mouth surface at the other end of the hole. The tool can then be retracted a relatively short distance to enable the other chamfer cutter to form a chamfer on the other end of the hole.

When the hole has been surface finished and chamfered at both of its ends the cutter support member is shifted a slight distance to space all three cutters away from the hole surfaces. Thereafter the tool is retracted axially out of the hole.

The invention contemplates a relatively simple tool construction for achieving axial and transverse movements of a three cutter cartridge in a pre-established cycle. The tool is designed to adequately withstand cutting forces without deflecting or vibrating.

In one form of the invention the tool comprises a hollow tool body that includes a radial face plate for clamping the tool body to the spindle of a cutting machine. The tool body has two spaced arms extending forwardly to swivably mount a cutter support member. The tool body also has a rearwardly extending tubular portion that fits within the cutting machine spindle to accommodate an actuator for adjusting the position of the cutter support member.

The cutter support member is swingably mounted in the tool body in teeter-totter fashion. One end of the support member carries a cutter cartridge. The other end of the support member extends within the tubular portion of the tool body. A cam connection between the end of the support member and the aforementioned actuator enables axial movement of the actuator to translate into a controlled swinging motion of the cutter support member, whereby the cutter cartridge shifts transversely across the tool body rotational axis.

Transverse adjustment of the cutter cartridge can be effected while the tool is rotating. The tool assembly does not have to be stopped before making the cutter cartridge adjustment.

THE DRAWINGS

DESCRIPTION OF A PREFERRED EMBODIMENT OF THE INVENTION

Figure 1:
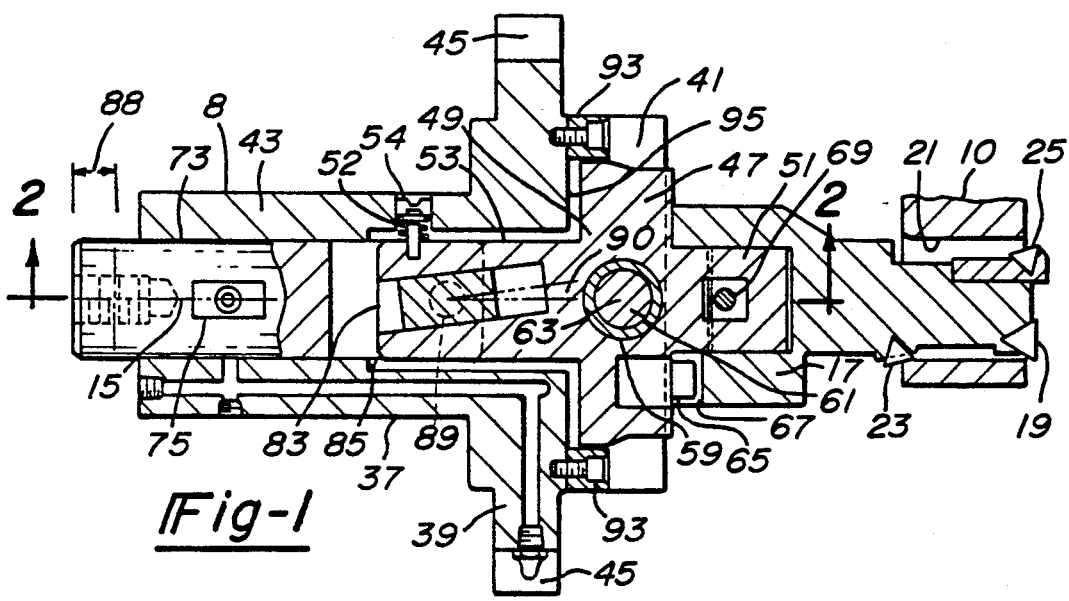
FIG. 1 is a longitudinal sectional view taken through a mechanism embodying the invention.
Figure 2:
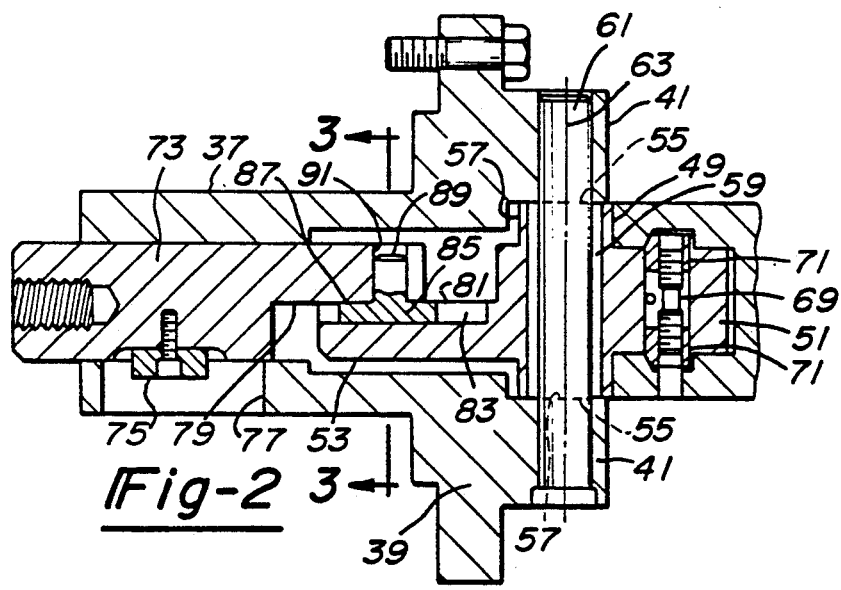
FIG. 2 is a fragmentary sectional view taken on line 2—2 in FIG. 1.

FIGS. 1 and 2 illustrate a tool mechanism 8 usable in a cutting machine, not shown, to surface-finish a hole in a workpiece and at the same chamfer the ends of the hole. In the drawing the workpiece is referenced by numeral 10. Fixtures, not shown, hold the workpiece in a stationary position while the cutting machine is performing cutting operations on the workpiece surfaces. The cutting machine has provisions for rotating tool mechanism 8 around the spindle axis 15, and for advancing or retracting the tool mechanism on the spindle axis.

A cutter cartridge (tool holder) 17 is carried on the tool mechanism for performing three cutting operations on work piece 10. The cartridge carries a first cutter element 19 oriented to machine the surface of a circular hole 21 pre-formed in workpiece 10. During the machining operation the cartridge is rotated around axis 15 while at the same time being fed axially in a left-to-right direction. Cutter element 19 machines the hole 21 surface as it moves therealong. Cutter element 19 is hereinafter referred to as a boring cutter.

A second cutter element 23 is carried on the cartridge to the left of cutter element 19 and slightly further away from the rotational axis 15. The two cutter elements are preferably located at a common radial line on the cartridge periphery, i.e., at the six o'clock position, as shown in FIG. 1. As cartridge 17 nears the end of its infeed stroke (left-to-right in FIG. 1) cutter element 23 strikes the left edge of hole 21. A slight further rightward motion of the cartridge enables cutter element 23 to form a chamfer on the hole edge. FIG. 1 shows the cartridge in a position wherein cutter element 23 is in the process of forming a chamfer on the left edge of hole 21. Cutter element 23 is hereinafter referred to as a chamfer cutter.

Another cutter element 25 is carried on cartridge 17 on an imaginary diametrical line passing through cutter element 19, i.e., at the twelve o'clock position in FIG. 1. Cutter element 25 has its cutting edge slightly to the left of the cutting tip of boring cutter 19. By shifting the cartridge transversely to axis 15 (i.e., upwardly in FIG. 1) it is possible to bring cutter element 25 into engagement with the right edge of hole 21. Thereafter the cartridge can be drawn a slight distance to the left, thereby enabling cutter element 25 to form a chamfer on the right edge of hole 21. Cutter element 25 is hereinafter referred to as a second chamfer cutter.

The cutter assembly can be withdrawn from the workpiece by first shifting the cartridge transversely to a position wherein the three cutters are within the hole 21 profile dimension. Thereafter the cutter assembly can be moved axially to the left, thereby retracting the cutter assembly away from the workpiece. The machined workpiece can then be removed and replaced with another workpiece.

Figure 3:
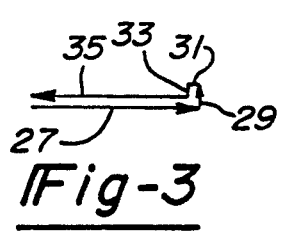
FIG. 3 is a diagram of motions achieved with the mechanism of FIGS. 1 and 2.
Figure 4:
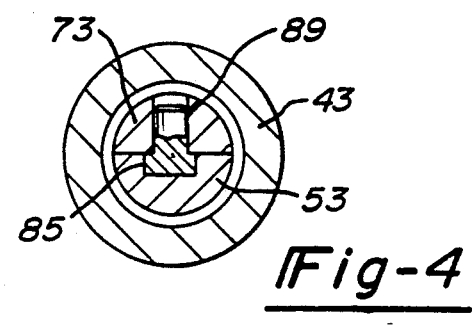
FIG. 4 is a transverse sectional view taken on line 4—4 in FIG. 2.

FIG. 3 illustrates diagrammatically the various motions of the cutter cartridge involved in one cycle. Initially the cartridge is moved to the right, as indicated by line 27, thereby enabling boring cutter 19 to machine the surface of hole 21; as cutter 19 passes beyond the right edge of the hole, chamfer cutter 23 forms a chamfer on the left edge of the hole. By shifting the cutter cartridge transversely, as indicated by line 29 in FIG. 3, cutter 25 is brought into registry with the right edge of hole 21. Thereafter, the cutter cartridge is moved a slight distance to the left, as indicated by line 31 in FIG. 3, whereby cutter 25 forms a chamfer on the right edge of hole 21. Lastly, the cartridge is moved transversely, as indicated by line 33, and axially as indicated by line 35, to retract the cutter assembly from the workpiece. During the operational sequence depicted in FIG. 3, tool mechanism 8 is in a rotating mode.

In an alternate arrangement, not shown, the workpiece 10 could be rotated around axis 15, and cartridge 17 could be in a non-rotating mode. The cartridge would be processed through the motions depicted in FIG. 3, but without being rotated. The nature of the workpiece is one factor in determining whether to rotate the cartridge 17 or to rotate the workpiece. Some workpiece configurations are not susceptible to being rotated during the machining process. In most cases the workpiece will be held in a fixed position, and cartridge 17 will be rotating.

Tool mechanism 8 is designed to accomplish the motion sequence of FIG. 3. The mechanism includes a tool body 37 having a circular face plate 39, two rightwardly extending arms 41 extending from the right face of plate 39, and a hollow tubular portion 43 extending from the left face of plate 39. Two diametrically spaced slots 45 are formed in the edge of plate 39 to key the plate to the spindle of a cutting machine. Bolts are extended through holes in the face plate to mount tool body 37 to the machine spindle.

A cutter support member 47 is swingably mounted on tool body 37. The cutter support member comprises a mounting portion 49 located between spaced arms 41, a cylindrical cartridge engagement means 51 extending rightwardly from the mounting portion, and a shaft 53 extending leftwardly from mounting portion 49 within the tubular portion 43 of the tool body 37.

Mounting portion 49 of the cutter support member has two flat side faces 55 that are in facial engagement with internal opposed faces 57 on arms 41, such that support member 47 is prevented from shifting transversely between the arms. A bushing 59 is press fit in a hole in mounting portion 49 to form a rotary bearing for a shaft 61 that has a press fit in aligned holes in arms 41.

Cutter support member 47 can therefore swivel or swing around the shaft 61 axis 63 to a limited extent.

As before noted, support member 47 has a cylindrical cartridge-engagement means 51 thereon. Cutter cartridge 17 has a socket adapted to fit on the cylindrical engagement means 51; a rectangular key 65 on support member 47 fits in a key slot 67 in the cartridge to prevent the cartridge from rotating relative to engagement means 51. Any suitable means can be used to clamp cutter cartridge 17 to engagement means 51. For example, a differential screw means 69 can be operatively connected to wedge elements 71 for positioning the wedge elements in pressure locking engagement with the cartridge. The cartridge acts as a holder for the three cutters 19, 23 an 25. The clamping means is shown in greater detail in U.S. Pat. No. 4,573,824 issued to R. G. Ehle and assigned to G.T.E. Products Corporation.

A shaft-type actuator 73 is slidably mounted within tubular portion 43 of tool body 37 for swingably adjusting the cutter support member 47 around swing axis 63. The shaft carries a rectangular key 75 that extends into a linear slot 77 in tool body 37, whereby the shaft is prevented from rotating around its axis.

The right end portion of shaft 37 is cut away to form a flat surface 79 located in a plane coincident with the shaft axis. Shaft portion 53 of cutter support member 47 is cut away on its left end to form a second flat surface 81 located in a plane coincident with the shaft axis. The two flat surfaces 79 and 81 are in facial engagement with each other. As seen in FIG. 3, the ends of the two shafts 73 and 53 overlap to provide operating support for cam elements 83 and 85.

Actuator shaft 73 has a cam connection with shaft 53, whereby axial motion of shaft 73 translates into swinging motion of cutter support member 47 around swing axis 63. The illustrated cam connection comprises a slot-type slideway 83 formed in flat surface 81, and a slider element 85 pivotably connected to the right end of actuator shaft 73. The slider element comprises a flat rectangular plate 87 seated flatwise against flat surface 79 and an integral pivot pin 89 extending from plate 87 into a circular hole 91 in shaft 73. Plate 87 fits into slot (slideway) 83, whereby the plate exerts a cam force on the slot side faces when shaft 73 is moved on axis 15.

Slot 87 extends at an acute angle 90 to an imaginary line connecting swing axis 63 and the axis of pivot pin 89. The acute angle is less than ten degrees in order to have a relatively long stroke distance for actuator shaft 73 per a given arcuate motion of member 47 around swing axis 63. The acute angle 90 is preferably about six degrees, as shown in FIG. 2. The stroke distance for actuator shaft 73 is depicted in FIG. 1 by numeral 88. The stroke distance 88 produces the transverse cutter element motion depicted by line 29 in FIG. 3.

Cutter support member 47 has a swingable teeter-totter type mount in tool body 37, whereby transverse motion of shaft 53 in one direction produces a transverse motion of cutters 19, 23 and 25 in the opposite direction. Shaft 73 provides the impetus for the teeter-totter motion of member 47.

The cam connection could be reversed, i.e., the linear slot 83 could be formed in flat surface 79 on shaft 73, and slider element 85 could be pivotably mounted on the left end of shaft 53. With either arrangement axial movement of the actuator shaft translates into swinging motion of cutter support member 47 around axis 63.

Any convenient power device can be used to move shaft 73 to the right or to the left. For example, a servodriven cam operator can be connected to the shaft to produce a controlled intermittent shaft 73 motion.

In order to prevent play or backlash in the connection between cutter support member 47 and shaft 73 a compression spring 52 is arranged between tool body 37 and shaft portion 53 of member 47; a set screw 54 is provided to adjust the spring force.

The mechanism shown in the drawings is a self-contained structure that can be installed as a unit on the spindle of the cutting machine. Support member 47 is mounted in tool body 37 by means of transverse shaft 61. That shaft can be a relatively long shaft having a relatively large diameter, whereby the shaft provides a rigid back-up force that minimizes (or prevents) any deflection of the mechanism due to cutting loads imposed thereon. Spaced arms 41 provide a rigid widestance support for shaft 61. Also, the spaced arms have relatively large face areas 57 abutting side faces 55 of cutter support member 47, such that member 47 is prevented from undesired play in directions parallel to swing axis 63.

Cartridge 17 has a relatively long axial dimension such that cutters 19 and 25 are spaced a relatively great distance from swing axis 63, compared to the spacing between pivot pin 89 and swing axis 63. The spacing between axis 63 and cutters 19 and 25 is more than twice the spacing between pin 89 and swing axis 63, such that cutter 25 moves in an essentially straight radial path during movement along the path of stroke 29 (FIG. 3).

The cam connection 83, 85 is located within the tool holder in a location shielded from ambient contaminants. Similarly, the pivot shaft 61 is also shielded against contamination. Two bars 93 are secured to tool body 37 to close the spaces between arms 41 at the opposite ends of mounting portion 49 of member 47; bars 93 prevent entry of dirt into the internal space defined by tool body 37. Flexible wiper strips (not shown) can be attached to bars 93 to enhance the dirt blockage action of the bars.

Cutter support member 47 has limited swinging motion around swing axis 63. Stops in the form of set screws can be threaded into member 47 to engage surface 95 on tool body 37 for thereby limiting the motion of member 47. Other types of motion limiter devices can also be used. For example, the motion of member 47 can be effectively limited by incorporating stops into key 73 on actuator shaft 73.

As previously noted, workpiece 10 is held in a fixed position, and the cutter assembly is rotated around axis 15. However, in an alternative arrangement the workpiece could be rotated, and the cutter assembly positioned in a non-rotating mode.

The invention is concerned primarily with the orientations of cutters 19, 23 and 25; the swingable mounting of cutter support member 47 in tool body 37; and the cam connection between actuator 73 and support member 47. The drawings necessarily show a specific embodiment of the invention. However, it will be appreciated that the invention can be practiced in other forms and configurations.

What is claimed is:

1. A mechanism for finishing a circular hole in a workpiece in a chamfer at each end of the hole; said mechanism having a longitudinal operating axis; a cutter support member swivably mounted on said tool body for pivotable motion around a second axis that intersects said longitudinal axis, said axis being transverse to said longitudinal axis; an actuator slidably mounted on said tool body for axial motion along the tool body longitudinal axis; and a cam connection comprising a slider element pivotally connected to said actuator for swinging motion around a third axis that is parallel to said second axis, said cam connection between said actuator and said cutter support member, said cutter support member having a mating slideway member; said slideway member being acutely angled to the movement axis of the actuator; said slider element being slidably engaged with the slideway whereby motion of the actuator along the tool body longitudinal axis causes the cutter support member to be pivotally adjusted around said second axis, whereby axial motion of the actuator is translated into pivotable motion of the cutter support member.

2. The mechanism of claim 1, wherein said actuator comprises a circularly cross-sectioned shaft having one end portion thereof cut away to form a flat surface located in a plane coincident with the actuator shaft axis; said slider element comprising a rectangular plate seated flatwise on the flat surface of the actuator shaft.

3. The mechanism of claim 2, wherein said actuator shaft has a circular hole extending from its flat surface; said rectangular plate having an integral pivot pin extending therefrom into said circular hole, whereby said slide element is pivotably connected to the actuator shaft.

4. The mechanism of claim 2, wherein said cutter support member has a circularly cross-sectioned shaft having an end portion thereof cut away to form a second flat surface located in a plane coincident with the cutter support member shaft axis; the flat surfaces on the actuator shaft and cutter support member shaft being in facial engagement; said slideway comprising a linear slot in the flat surface of the cutter support member shaft.

5. The mechanism of claim 1, wherein said tool body has two opposed parallel flat faces extending transverse to said second axis; said cutter support member having two flat side faces facially engaged with the opposed flat faces on the tool body, whereby said cutter support member is prevented from shifting in directions parallel to said second axis.

6. The mechanism of claim 1, wherein said tool body comprises two spaced arms having opposed parallel flat faces extending transverse to said second axis; said cutter support member having a mounting portion thereof fitting snugly within the space defined by said arms to prevent undesired play of the cutter support member in directions parallel to said second axis.

7. The mechanism of claim 6, and further comprising a pivot shaft extending through the spaced arms and the mounting portion of the cutter support member on said second axis for swivably mounting the cutter member on the tool body.

8. The mechanism of claim 7, wherein said cutter support member includes a bushing encircling said pivot shaft; said pivot shaft having a press fit in said spaced arms.

9. The mechanisms of claim 1, and further comprising a cutter cartridge means detachably mounted on said cutter support member; said cutter cartridge means comprising a first chamfer cutter, a second chamfer cutter, and a boring cutter.

10. The mechanism of claim 9, wherein said first chamfer cutter and said boring cutter are spaced radially from the tool body longitudinal axis on a common radial plane so that during a single infeed of the tool body the boring cutter forms a finished hole surface in the workpiece and the first chamfer cutter forms a chamfer surface at one end of the workpiece hole.

11. The mechanism of claim 10, wherein said second chamfer cutter is located in essentially a common diametrical plane with said boring cutter, whereby after conclusion of an infeed stroke of the tool body said actuator can be moved along the tool body longitudinal axis to simultaneously shift the boring cutter away from the workpiece hole surface and the second chamfer cutter into engagement with the other end of the workpiece hole.

12. The mechanism of claim 11, wherein said boring cutter and second chamfer cutter are located a first distance away from said second axis; said cam connection being located a second distance from said second axis; said first distance being appreciably greater than said second distance.

13. The mechanism of claim 12, wherein said first distance is at least twice said second distance.

14. The mechanism of claim 1, wherein said cam connection comprises a slider element pivotably connected to said actuator for swinging motion around a third axis that is parallel to said second axis, and a mating slideway on said cutter support member; said slideway being acutely angled to an imaginary plane containing said second axis and said third axis.

15. The mechanism of claim 14, wherein the angle between said slideway and said imaginary plane is less than ten degrees.

16. The mechanism of claim 15, wherein said angle is approximately six degrees.

17. The mechanism of claim 1, wherein said hollow tool body comprises a radial face plate, two spaced arms extending from said face plate in a first direction, and a hollow tubular portion extending from said face plate in a second direction; said cutter support member comprising a mounting portion located between said spaced arms and a shaft extending from said mounting portion within the tubular portion of the tool body; said actuator comprising an actuator shaft extending within the tubular portion of the tool body; said cutter support member shaft and said actuator shaft having overlapping ends; said cam connection being located within the overlapping ends of said shafts.

* * * * *